(12) United States Patent
Behrens et al.

(10) Patent No.: US 9,006,361 B2
(45) Date of Patent: Apr. 14, 2015

(54) AQUEOUS DISPERSIONS OF POLYMERS WHICH COMPRISE A FLUORESCENT DYE, PROCESS FOR THEIR PRODUCTION AND THEIR USE FOR MARKING MATERIALS

(71) Applicant: BASF SE, Ludwigshafen (DE)

(72) Inventors: Sven Holger Behrens, Atlanta, GA (US); Simon Champ, Ludwigshafen (DE); Ulrike Geissler, Mannheim (DE); Hans-Peter Hentze, Mannheim (DE); Marc Rudolf Jung, Worms (DE); Hans-Peter Kaub, Altrip (DE); Simon Nord, Roemerberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/230,549

(22) Filed: Mar. 31, 2014

(65) Prior Publication Data

US 2014/0209836 A1  Jul. 31, 2014

Related U.S. Application Data

(62) Division of application No. 12/097,559, filed as application No. PCT/EP2006/069520 on Dec. 11, 2006, now Pat. No. 8,735,518.

(30) Foreign Application Priority Data

Dec. 22, 2005 (DE) .......................... 10 2005 062 027
Feb. 10, 2006 (EP) ..................................... 06101550

(51) Int. Cl.
*C08F 2/18* (2006.01)
*C08F 2/44* (2006.01)
*C08K 5/00* (2006.01)
*C08L 33/08* (2006.01)
*C09K 11/06* (2006.01)
*C08F 220/14* (2006.01)
*C08F 220/40* (2006.01)

(52) U.S. Cl.
CPC . *C09K 11/06* (2013.01); *C08F 2/18* (2013.01); *C08F 220/14* (2013.01); *C08F 220/40* (2013.01); *C08K 5/0008* (2013.01); *C08K 5/0041* (2013.01)

(58) Field of Classification Search
CPC ............. C08K 11/06; C08K 5/08; C08K 5/41
USPC ............................................ 526/89, 204, 217
See application file for complete search history.

(56) References Cited

U.S. PATENT DOCUMENTS

| 5,607,864 | A  | * | 3/1997 | Ricchiero et al. ............. 436/533 |
| 5,710,197 | A  | * | 1/1998 | Fischer et al. .................. 524/82 |
| 6,541,032 | B1 |   | 4/2003 | Medelnick et al. |
| 6,727,318 | B1 |   | 4/2004 | Mathauer et al. |
| 7,176,255 | B2 |   | 2/2007 | Mathauer et al. |
| 2002/0131941 | A1 |   | 9/2002 | Habeck et al. |
| 2005/0075453 | A1 |   | 4/2005 | Mathauer et al. |
| 2006/0009571 | A1 |   | 1/2006 | Dyllick-Brenzinger et al. |
| 2008/0042106 | A1 |   | 2/2008 | Champ et al. |

FOREIGN PATENT DOCUMENTS

| DE | 10 2004 027 416 | 12/2005 |
| EP | 0 105 057 | 4/1984 |
| EP | 0 496 149 | 7/1992 |
| EP | 0 692 517 | 1/1996 |
| EP | 1 191 041 | 3/2002 |
| WO | 99/40123 | 8/1999 |
| WO | 99/52708 | 10/1999 |
| WO | 2004/037867 | 5/2004 |
| WO | WO 2005/105931 A1 | 11/2005 |

OTHER PUBLICATIONS

Brownyn J. Battersby, et al., "Optical barcoding of colloidal suspension: application in genomics, proteomics and drug discovery", Chem. Commun., 2002, pp. 1435-1441.

* cited by examiner

*Primary Examiner* — Kelechi Egwim
(74) *Attorney, Agent, or Firm* — Oblon, McClelland, Maier & Neustadt, L.L.P.

(57) ABSTRACT

Aqueous dispersions of polymers which obtained by free radical suspension polymerization or free radical miniemulsion polymerization of ethylenically unsaturated monomers in an oil-in-water emulsion whose disperse phase comprises at least one fluorescent dye dissolved in at least one ethylenically unsaturated monomer and has an average particle diameter of at least 1 μm, in the presence of at least one surface-active compound and at least 0.5% by weight, based on the monomers, of at least one hydrophobic, nonpolymerizable, organic compound, of a hydrophobic polymer of at least one $C_2$- to $C_\sim$-olefin having a molar mass Mw of up to 10000, of a siloxane having a molar mass Mw of up to 5000 and/or polystyrene having a molar mass Mw of up to 10000, and of the powders obtainable from these polymer dispersions in each case by drying and comprising at least one fluorescent dye for marking of materials.

17 Claims, No Drawings

AQUEOUS DISPERSIONS OF POLYMERS WHICH COMPRISE A FLUORESCENT DYE, PROCESS FOR THEIR PRODUCTION AND THEIR USE FOR MARKING MATERIALS

This application is a divisional application of U.S. Ser. No. 12/097,559 filed on Jun. 16, 2008 which is a 371 application of PCT/EP2006/069520 filed on Dec. 11, 2006.

The invention relates to aqueous dispersions of polymers which have a particle diameter of at least 1 μm and comprise a fluorescent dye, processes for the preparation of such dispersions by free radical suspension polymerization of ethylenically unsaturated monomers in an oil-in-water emulsion whose disperse phase comprises at least one fluorescent dye dissolved in at least one ethylenically unsaturated monomer and has an average particle diameter of at least 1 μm, in the presence of at least one surface-active compound, and the use of the aqueous dispersions thus obtainable or of the polymer powders obtainable therefrom for the marking of materials.

WO-A-99/40123 discloses a process for the preparation of aqueous polymer dispersions whose dispersed polymer particles comprise an organic dye distributed homogeneously, i.e. as a molecular dispersion. Such aqueous dispersions are prepared by miniemulsion polymerization by polymerizing ethylenically unsaturated monomers which comprise a dissolved organic dye, in the form of an oil-in-water emulsion in the presence of polymerization initiators forming free radicals, the disperse phase of the emulsion being formed substantially by dye-containing monomer droplets having a diameter of <500 nm. In an advantageous embodiment of the invention, monomer mixtures which comprise crosslinking monomers are used in the polymerization. The polymer dispersions are stable to sedimentation. The dispersed particles have an average particle diameter of from 100 to 400 nm. They can be obtained from the aqueous dispersions with the aid of conventional drying methods. The dye-containing polymer dispersions are used, for example, for the pigmenting of high molecular weight organic and inorganic materials, and for the pigmenting of printing inks and of inks for inkjet printing.

Further dye-containing polymer dispersions whose dye-containing polymer particles have an average particle diameter below 1000 nm are disclosed in EP-A-1 191 041. Suitable colorants in addition to organic dyes are also UV absorbers and optical brighteners. They are prepared by dissolving a colorant in at least one ethylenically unsaturated monomer, emulsifying this solution in water with formation of a conventional macroemulsion, homogenizing the macroemulsion with formation of a miniemulsion having an average droplet size below 1000 nm and polymerizing the miniemulsion in the presence of a free radical polymerization initiator, from 0.1 to 20% by weight of at least one nonionic surface-active compound and from 1 to 50% by weight, based in each case on the monomers used, of at least one amphiphilic polymer. The polymer particles comprise from 0.5 to 50% by weight of at least one homogeneously distributed organic dye, optical brightener or UV absorber, which is to be understood as meaning that the organic colorants are dissolved in monomolecular form in the polymer matrix or are present in the form of bimolecular or higher molecular aggregates.

WO-A-2004/037867 discloses aqueous polymer dispersions which comprise alkyldiketenes and are obtainable by miniemulsion polymerization of hydrophobic monoethylenically unsaturated monomers in the presence of alkyldiketenes. These dispersions are used as sizes for paper and as water repellents for leather, natural and/or synthetic fibers and textiles.

B. J. Battersby, G. A. Lawrie, A. P. R. Johnston and M. Trau, in Chem. Commun., 2002, 1435-1441, report on optical coding of colloidal suspensions with fluorescent dyes, nanocrystals and metals. Thus, for example, colloids having a diameter of from 3 to 6 μm were optically marked by incorporating fluorescent dyes or complexed lanthanides. Another method for marking colloids consists in the incorporation of zinc sulfide which is provided with cadmium selenide nanocrystals or in the electrochemical deposition of metal ions in cavities of colloids. The colloids can be distinguished from one another, for example, with the aid of a fluorescence microscope or of a cytometer.

WO-A-99/52708 discloses a process for the marking of gaseous, liquid or solid materials, a sufficient amount of colored microparticles and/or nanoparticles which are bound to carrier microparticles being added to a gaseous, liquid or solid material which is to be subsequently identified. The particles used consist, for example, of crosslinked polystyrene and have a diameter of about 5.5 μm. The particles are stained or coded, for example, with three different fluorescent dyes in eight different concentrations of the dyes so that 512 different groups of coded particles are obtained. The individual groups can be identified, for example, with the aid of a cytometer. The coded particles are used for the marking of substances, e.g. sodium chloride crystals, in order, for example, to verify the manufacturer, the production batch and the production date in this way.

DE-A 2004 027 416 discloses a process for the marking of materials with coded microparticles, the coded microparticles used being obtainable by (i) polymerization of at least one water-soluble monoethylenically unsaturated monomer in the presence of at least one ethylenically unsaturated monomer having at least two double bonds in the molecule by inverse water-in-oil suspension polymerization in the presence of doped nanoparticles as a suspending medium, (ii) emulsion polymerization of water-insoluble monoethylenically unsaturated monomers with from 0 to 10% by weight, based on the monomer mixture, of at least one ethylenically unsaturated monomer having at least two double bonds in the molecule, doped nanoparticles being used as an emulsifier for stabilizing the disperse phase, (iii) polymerization of at least one ethylenically unsaturated monomer together with a copolymerizable dye which has an ethylenically unsaturated double bond and, if appropriate, agglomeration of these particles, (iv) adsorption of at least one dye onto a virtually water-insoluble polymer particle, and, if appropriate, agglomeration of these particles, (v) agglomeration of at least two different groups of microparticles which differ in their absorption, emission and/or scattering of electromagnetic radiation to give agglomerates having an average particle diameter of from 300 nm to 500 μm, (vi) precipitation of at least one water-insoluble dye from a solution in at least one water-miscible organic solvent onto a virtually water-insoluble polymer particle or (vii) precipitation by electrostatic attraction of water-soluble dyes onto oppositely charged virtually water-insoluble polymer particles.

For example, nanoparticles which are doped with at least one dye or a compound from the group consisting of the rare earth metals of the Periodic Table of the Elements or which are radioactive are used in the polymerization according to (i) and (ii).

EP-B-0 692 517 discloses a process for the preparation of fluorescent pigments, a mixture of
(A) from 69.9 to 99.8% by weight of a $C_1$-$C_8$-alkyl ester of acrylic or methacrylic acid,
(B) from 0 to 29.9% by weight of a copolymerizable, monoethylenically unsaturated monomer,
(C) from 0.1 to 30.0% by weight of a copolymerizable, polyfunctional, crosslinking monomer being polymerized in the presence of
(D) from 0.1 to 15.0% by weight, based on the sum of (A) and (B), of a nonpolar fluorescent dye from the coumarin and perylene series.

being polymerized in suspension. The diameter of the polymer particles dispersed in water and comprising a fluorescent dye is in the range of from 0.1 to 3 mm if the monomers are emulsified in water with the aid of an impeller stirrer and from 1 to 100 μm if the monomers are emulsified in water with the aid of units having a strong shearing effect, such as Ultra-Turrax®, and the emulsions are then polymerized. However, the aqueous polymer dispersions thus obtainable have a broad particle size distribution.

It is the object of the invention to provide aqueous dispersions of polymers which have a particle diameter of at least 1 μm and which comprise a fluorescent dye, having as uniform a particle size distribution as possible. Such polymer dispersions are of interest in particular for single-particle analysis because particle sizes of, for example, from 1 to 100 μm can be particularly advantageously determined analytically.

The object is achieved, according to the invention, by aqueous dispersions of polymers which have a particle diameter of at least 1 μm and which comprise a fluorescent dye, which are obtainable by free radical suspension polymerization of ethylenically unsaturated monomers in an oil-in-water emulsion whose disperse phase comprises at least one fluorescent dye dissolved in at least one ethylenically unsaturated monomer and has an average particle diameter of at least 1 μm, in the presence of at least one surface-active compound and at least 0.5% by weight, based on the monomers, of at least one hydrophobic, nonpolymerizable, organic compound, of hydrophobic polymers of at least one $C_2$- to $C_6$-olefin having a molar mass $M_w$ of up to 10 000, of a siloxane having a molar mass $M_w$ of up to 5000 and/or polystyrene having a molar mass $M_w$ of up to 10 000.

The synthesis of the polymer particles dispersed in water is effected, according to the invention, by suspension polymerization. In contrast to the process which is disclosed in the abovementioned EP-B-0692 517 a cosolvent which is only very slightly soluble in water and is intended for the fluorescent dye is used as a hydrophobic substance in the process according to the invention, in addition to the monomers, at least one fluorescent dye and a surface-active compound. The water solubility of the hydrophobic substance is, for example, <0.1 g/l, preferably <0.01 g/l (at 25° C. and at 1013 mbar). It is possible to use all hydrophobic compounds which are usually used in miniemulsion polymerization, cf. WO-A-99/40123, page 7, line 27 to page 8, line 20. In contrast to the preparation of a miniemulsion, however, according to the invention shearing is not effected to such a great extent in the emulsification of the solution comprising at least one fluorescent dye and comprising at least monomers and a hydrophobic substance in water, so that an oil-in-water emulsion having an average particle size of at least 1 μm is obtained. The average particle size of the oil-in-water emulsion is therefore substantially above the particle size customary in the case of miniemulsions. The dispersed polymer particles which comprise the uniformly distributed fluorescent dye form from the emulsified monomer droplets. This process can also be referred to as minisuspension polymerization.

According to the invention, aqueous dispersions of polymers which comprise at least one fluorescent dye, have an average particle size in the range of from 1 to 100 μm and have a narrower particle size distribution than the polymer dispersions which are prepared with exclusion of hydrophobic compounds (cf. EP-B-0 692 517) are obtained. Compared with the known process, less coagulum is formed in the process according to the invention and in addition the emulsion polymerization as a secondary reaction is very substantially suppressed.

Suitable ethylenically unsaturated monomers are, for example, (a) hydrophobic monomers from the group consisting of $C_1$- to $C_{18}$-alkyl esters of acrylic acid, $C_1$- to $C_{18}$-alkyl esters of methacrylic acid, vinyl acetate, vinyl propionate, vinyl butyrate, styrene, chlorostyrene and/or α-methylstyrene, (b) if appropriate, hydrophilic monomers from the group consisting of ethylenically unsaturated $C_3$- to $C_6$-carboxylic acids, vinylsulfonic acid, 2-acrylamido-2-methylpropanesulfonic acid, sulfopropyl acrylate, sulfopropyl methacrylate, styrenesulfonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylate, di-$C_1$- to $C_3$-alkylamino-$C_2$- to $C_4$-alkyl methacrylates, acrylamide, methacrylamide, N-vinylformamide and/or N-vinylpyrrolidone and (c) if appropriate, at least one crosslinking monomer having at least two double bonds in the molecule.

The monomers of group (a) can be used alone, as a mixture of one another and in combination with the monomers (b) and/or (c) in the suspension polymerization. Examples of monomers of group (a) are methyl acrylate, ethyl acrylate, isopropyl acrylate, n-propyl acrylate, n-butyl acrylate, isobutyl acrylate, tert-butyl acrylate, sec-butyl acrylate, pentyl acrylate, n-hexyl acrylate, octyl acrylate, 2-ethylhexyl acrylate, decyl acrylate, dodecyl acrylate, palmityl acrylate, stearyl acrylate, methyl methacrylate, ethyl methacrylate, isopropyl methacrylate, n-propyl methacrylate, n-butyl methacrylate, isobutyl methacrylate, sec-butyl methacrylate, tert-butyl methacrylate, pentyl methacrylate, n-hexyl methacrylate, cyclohexyl methacrylate, heptyl methacrylate, 2-ethylhexyl methacrylate, octyl methacrylate, decyl methacrylate, dodecyl methacrylate, palmityl methacrylate and stearyl methacrylate and vinyl acetate, vinyl propionate, vinyl butyrate, styrene, chlorostyrene and/or α-methylstyrene. Preferably used monomers of this group are methyl methacrylate and styrene.

Monomers of group (b), which, if appropriate, are used for the hydrophilic modification of the polymers, are selected, for example, from the group consisting of the ethylenically unsaturated $C_3$- to $C_6$-carboxylic acids, vinylsulfonic acid, 2-acrylamido-2-methylpropanesulfonic acid, sulfopropyl acrylate, sulfopropyl methacrylate, styrenesulfonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylates, di-$C_1$- to $C_3$-alkylamino-$C_2$- to $C_4$-alkyl methacrylates, acrylamide, methacrylamide, N-vinylformamide and/or N-vinylpyrrolidone.

Examples of ethylenically unsaturated carboxylic acids are acrylic acid, methacrylic acid, crotonic acid, maleic acid, fumaric acid, itaconic acid and vinylacetic acid. The ethylenically unsaturated carboxylic acids and the monomers comprising sulfo groups can be used in the polymerization in the form of the free acids and in a form partly or completely neutralized with alkaline metal bases, alkaline earth metal bases, ammonia or amines. In general, the sodium, potassium or ammonium salts of the acidic monomers are used. The acidic monomers can, however, also be neutralized with amines, such as butylamine, morpholine, ethanolamine, diethanolamine or triethanolamine, and used in partly or completely neutralized form in the polymerization. Among the hydroxyalkyl esters, 2-hydroxyethyl acrylate, 2-hydroxyethyl methacrylate, hydroxypropyl acrylate, hydroxybutyl acrylate and 2-hydroxypropyl methacrylate are particularly suitable.

Examples of basic monomers are dimethylaminoethyl acrylate, dimethylaminoethyl methacrylate, dimethylaminopropyl acrylate, dimethylaminopropyl methacrylate, diethylaminoethyl acrylate, diethylaminoethyl methacrylate, di-n-propylaminoethyl acrylate and di-n-propylaminoethyl methacrylate. The basic monomers can be used in the polymerization as a free base, as a salt with mineral acids, saturated carboxylic acids or sulfonic acids, such as p-toluenesulfonic acid or benzenesulfonic acid, and in quaternized form, (e.g. quaternized with methyl chloride, ethyl chloride, n-propyl chloride, dimethyl sulfate, n-hexyl chloride, cyclohexyl chloride or benzyl chloride).

The monomers of group (b) can be used individually or in combination in the polymerization. Preferably, acrylic acid, methacrylic acid, acrylamide, methacrylamide, vinylformamide and N-vinylpyrrolidone are used from this group.

Crosslinking monomers having at least two double bonds in the molecule are used as monomers of group (c). Examples of such monomers are esters of polyhydric alcohols and ethylenically unsaturated carboxylic acids, such as acrylic acid or methacrylic acid, e.g. ethylene glycol diacrylate, ethylene glycol dimethacrylate, butanediol diacrylate, butanediol dimethacrylate, hexanediol diacrylate, hexanediol dimethacrylate, acrylates and methacrylates of polyalkylene glycols, such as polyethylene glycols, polypropylene glycols or block copolymers of ethylene oxide and propylene oxide having molar masses of, for example, from 100 to 5000, allyl acrylate, allyl methacrylate, trimethylolpropane triacrylate, trimethylolpropane trimethacrylate, pentaerythrityl triacrylate, pentaerythrityl trimethacrylate, pentaerythrityl tetraacrylate, pentaerythrityl tetramethacrylate, divinylbenzene, divinylurea and methylenebisacrylamide. Allyl methacrylate, butanediol 1,4-diacrylate and trimethylolpropane triacrylate are preferred as crosslinking agents.

The monomer mixtures used in the polymerization comprise, for example,
(a) from 60 to 100% by weight of at least one hydrophobic monomer,
(b) from 0 to 30% by weight of at least one hydrophilic monomer and
(c) from 0 to 40% by weight of at least one crosslinking monomer having at least two double bonds.

Monomer mixtures which comprise
(a) from 60 to 99.9% by weight of at least one hydrophobic monomer,
(b) from 0 to 30% by weight of at least one hydrophilic monomer and
(c) from 0.1 to 25% by weight, in particular from 5 to 15% by weight, of at least one crosslinking monomer
are preferably used in the polymerization.

Fluorescent dyes are known to the person skilled in the art. They are described, for example, in WO-A-99/40123, page 10, line 14 to page 25, line 25, mentioned in connection with the prior art, and in EP-B-0 692 517, page 3, line 7 to page 6, line 1. Suitable fluorescent dyes belong, for example, to the class consisting of the coumarin, perylene, terrylene, quaterrylene, naphthalimide, cyanine, xanthene, oxazine, anthracene, naphthacene, anthraquinone or thiazine dyes. Those fluorescent dyes which have a higher solubility in the oil phase than in the aqueous phase of the oil-in-water emulsion are preferably used. For example, the dyes should have a solubility of at least 0.001% by weight, preferably of at least 0.01% by weight, in the oil phase.

In order to prepare aqueous dispersions of finely divided polymers which comprise a fluorescent dye and have an average particle diameter of at least 1 μm, it is possible, for example, to adopt a procedure in which first at least one fluorescent dye is dissolved in a mixture of at least one of the suitable monomers and at least one hydrophobic compound and this solution is then emulsified in an aqueous phase which comprises at least one surface-active compound. The emulsification of the oil phase in the aqueous phase can be carried out, for example, with the aid of a high-speed stirrer or with the aid of apparatuses which operate according to the rotor-stator principle, such as Ultra-Turrax®. Oil-in-water emulsions having an average particle size of the oil droplets of from at least 1 μm to 100 μm, preferably from 1.1 to 25 μm, are obtained.

A substantial constituent of the aqueous dispersions, according to the invention, of polymers which comprise at least one fluorescent dye is a hydrophobic substance. Examples of this are hydrophobic, nonpolymerizable, organic compounds, hydrophobic polymers of at least one $C_2$- to $C_6$-olefin having a molar mass $M_w$ of up to 10 000, siloxanes having a molar mass $M_w$ of up to 5000 and/or polystyrenes having a molar mass $M_w$ of up to 10 000. Hydrophobic, nonpolymerizable, organic compounds are to be understood as meaning all compounds which have, for example, a solubility in water of <0.01 g/l (at 25° C. and 1013 mbar). Examples of these are aliphatic or aromatic hydrocarbons having 10 to 50 carbon atoms, preferably having 10 to 24 carbon atoms, alcohols having 10 to 24 carbon atoms, tetraalkylsilanes, olive oil, perfluoromethyldecaline and/or di-n-butyl esters of $C_4$- to $C_6$-dicarboxylic acids.

Particularly preferably used hydrophobic compounds from this group are hexadecane and liquid paraffins, such as industrial or medical white oil. Such a white oil is available, for example, under CAS No. 8042-47-5. This is a petroleum mineral oil as a complex combination of saturated hydrocarbons having carbon numbers in the range from C15 to C50. It is also possible to use mixtures of hydrophobic, nonpolymerizable organic compounds, for example mixtures of hexadecane and white oil. Like the other hydrophobic compounds, it is used, for example, in an amount of from 0.5 to 50% by weight, preferably in an amount of from 1 to 20% by weight, based on the monomers.

Further suitable hydrophobic substances are homopolymers of at least one $C_2$- to $C_6$-olefin or copolymers of $C_2$- to $C_6$-olefins having a molar mass $M_w$ of up to 10 000. Polymers of this type are, for example,
(i) homopolymers of ethylene, propylene, 1-butene, 2-butene, 1-pentene or 1-hexene, having an average molar mass $M_w$ of from 100 to 1000,
(ii) copolymers of at least two of the monomers mentioned under (i) and having an average molar mass $M_w$ of from 100 to 1000 and/or
(iii) polyisobutylene having an average molar mass $M_w$ of at least 100.

Examples of polymers of group (i) are low molecular weight homopolymers of ethylene, propylene, 1-butene, 1-pentene, and 1-hexene. These are, for example, oligomers of ethylene, such as, in particular, polymers comprising 8 or 12 carbon atoms per molecule, which are offered by Shell under the brand Neodene® and by BP as alpha-olefin, e.g. AO 2026 and by Chevron-Philips Corporation. The tetramer propene available from Exxon-Mobil and the tetrabutene sold by Oxeno are also suitable as compound (i). The compounds (i) comprise a double bond. They have, for example, an average molar mass $M_w$ of from 100 to 10 000, preferably from 150 to 2000.

Examples of compounds (ii) are copolymers of ethylene and propylene, copolymers of ethylene and 1-butene, copolymers of ethylene and 2-butene, copolymers of ethylene and 1-hexene, copolymers of propylene and 1-butene and copolymers of propylene, 1-butene and 2-butene and further combinations. These copolymers also comprise an ethylenically unsaturated double bond. They have, for example, average molar masses $M_w$ of from 100 to 10 000, preferably from 150 to 2000.

Polyisobutylenes are suitable as compounds of group (iii). They have, for example, an average molar mass $M_w$ of at least 100, preferably at least 150. The average molar masses $M_w$ are, for example, in the range of from 200 to 10 000. In general, the average molar mass $M_w$ of the suitable polyisobutylenes is at least 400 and preferably in the range of from 500 to 4000.

Suitable polyisobutylenes are commercially available. Examples of these are the Glissopal® brands and Oppanol® brands from BASF Aktiengesellschaft, such as Glissopal® 550, Glissopal® 1000, Glissopal® 1300, Glissopal® 2300, Oppanol B10 and B12. Polyisobutylene is prepared, for example, by cationic polymerization of isobutene under $BF_3$ catalysis. These polyisobutylenes have a high content of α-olefin groups, which is, for example, at least 80%, preferably at least 85%. They can also be prepared by so-called "living" polymerization using Lewis acids other than $BF_3$, such as $AlY_3$, $TiY_4$, $SnY_4$ and $ZnY_2$, the substituent Y in the preceding formulae being fluorine, chlorine, bromine or iodine. Polyisobutylenes having a content of at least 80% of α-olefin groups are preferably used. Further examples of compounds to be used according to the invention as (iii) are the polyisobutylenes offered by BP under the name Indopol® and having the designations L2-L-50 and H-7 to H-18 000 which have a molar mass in the range of from 180 to 6000. These polyisobutylenes likewise comprise α-olefin groups, but only up to about 10%.

Depending on the polymerization process, the polydispersity index (PDI) for these polymers, i.e. the ratio of weight average and number average molecular weight, is in the range of from 1.05 to 10, preferably in the range of from 1.05 to 5 and in particular in the range of from 1.05 to 2.0. The method of determination of the polydispersity (PDI) and of the number average and weight average molecular weight is described, for example, in Analytiker-Taschenbuch, volume 4, pages 433 to 442, Berlin 1984.

Preferably used hydrophobic compounds from these groups are, for example, (i) tetramer propene and tetrameric butene, (ii) copolymers of ethylene and propylene, copolymers of ethylene and 1-butene, copolymers of ethylene and 2-butene, copolymers of ethylene and 1-hexene, copolymers of propylene and 1-butene and copolymers of propylene, 1-butene and 2-butene having a molar mass of in each case from 150 to 2000 and/or (iii) polyisobutylenes having a molar mass in the range of from 200 to 10 000.

Further suitable hydrophobic substances are siloxanes having a molar mass $M_w$ of up to 5000 and/or polystyrenes having a molar mass $M_w$ of up to 10 000.

In order to stabilize the oil-in-water emulsion, at least one surface-active compound is usually used. The surfactant is used, for example, in amounts of up to 15% by weight, for example from 0.05 to 15% by weight, preferably from 0.05 to 5% by weight and in particular from 0.1 to 2% by weight, based in each case on the total dispersion. It is present either in the aqueous phase, in the organic phase or in both phases. It is preferably added to the aqueous phase before the emulsification. In principle, all surfactants may be used. Preferably used surfactants are anionic and/or nonionic surfactants and amphiphilic polymers having average molar masses $M_w$ of, for example, from 1000 to 100 000. Examples of suitable surfactants are sodium lauryl sulfate, sodium dodecyl sulfate, sodium hexadecyl sulfate, sodium dioctyl sulfosuccinate and/or adducts of from 15 to 50 mol of ethylene oxide and/or propylene oxide and 1 mol of a $C_{12}$- to $C_{22}$-alcohol.

The oil-in-water emulsion may additionally be stabilized with the aid of amphiphilic polymers, which, if appropriate, are used. If amphiphilic polymers are used they are employed in amounts of, for example, from 0.05 to 15% by weight, preferably from 0.5 to 5% by weight, based on the monomers used in the polymerization. Examples of amphiphilic polymers are copolymers which comprise units of
  (i) hydrophobic monoethylenically unsaturated monomers and
  (ii) monoethylenically unsaturated carboxylic acids, monoethylenically unsaturated sulfonic acids, monoethylenically unsaturated phosphonic acids or mixtures thereof and/or basic monomers.

Suitable hydrophobic monoethylenically unsaturated monomers
  (i) are, for example, styrene, methylstyrene, ethylstyrene, acrylonitrile, methacrylonitrile, $C_2$- to $C_{18}$-olefins, esters of monoethylenically unsaturated $C_3$- to $C_5$-carboxylic acids, and polyhydric alcohols, vinyl alkyl ethers, vinyl esters or mixtures thereof. From this group of monomers, isobutene, diisobutene, styrene and acrylates such as ethyl acrylate, isopropyl acrylate, n-butyl acrylate and sec-butyl acrylate are preferably used.

The amphiphilic copolymers comprise, as hydrophilic monomers
  (ii) preferably acrylic acid, methacrylic acid, maleic acid, maleic anhydride, itaconic acid, vinylsulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid or mixtures thereof incorporated in the form of polymerized units. The acidic monomers can be present in the form of the free acids or in partly or completely neutralized form.

Further suitable hydrophilic monomers are basic monomers. They can be polymerized with the hydrophobic monomers (i) alone or as a mixture with the abovementioned acidic monomers. If mixtures of basic acidic monomers are used, amphoteric copolymers which, depending on the molar ratio of acidic to basic monomers incorporated in each case in the form of polymerized units, are anionically or cationically charged.

Basic monomers are, for example, di-$C_1$- to $C_2$-alkylamino-$C_2$- to $C_4$-alkyl(meth)acrylates or diallyldimethylammonium chloride. The basic monomers can be present in the form of the free bases, of the salts with organic or inorganic acids or in the form quaternized with alkyl halides. The salt formation or the quaternization, in which the basic monomers become cationic, can be effected partially or completely. Examples of such compounds are dimethylaminoethyl methacrylate, diethylaminoethyl methacrylate, dimethylaminoethyl acrylate, diethylaminoethyl acrylate, dimethylaminopropyl methacrylate, dimethylaminopropyl acrylate, diethylaminopropyl methacrylate, diethylaminopropyl acrylate and/or dimethylaminoethyl acrylamide, dimethylaminoethyl methacrylamide, dimethylaminopropyl acrylamide, dimethylaminopropyl methacrylamide and/or diallyldimethylammonium chloride.

If the amphiphilic copolymers are not sufficiently water-soluble in the form of the free acid they are used in the form of water-soluble salts; for example the corresponding alkali metal, alkaline earth metal and ammonium salts are used. These salts are prepared, for example, by partial or complete neutralization of the free acid groups of the amphiphilic copolymers with bases; for example, sodium hydroxide solution, potassium hydroxide solution, magnesium oxide, ammonia or amines such as triethanolamine, ethanolamine, morpholine, triethylamine or butylamine, are used for the neutralization. The acid groups of the amphiphilic copolymers are preferably neutralized with ammonia or sodium hydroxide solution. The water solubility of basic monomers or of copolymers which comprise such monomers incorporated in the form of polymerized units can on the other hand be increased by partial or complete neutralization with a mineral acid, such as hydrochloric acid or sulfuric acid, or by addition of an organic acid, such as acetic acid or p-toluenesulfonic acid. The molar mass of the amphiphilic copolymers is, for example, from 1000 to 100 000 and is preferably in the range of from 1500 to 10 000. The acid numbers of the amphiphilic copolymers are, for example, from 50 to 500, preferably from 150 to 350 mg KOH/g of polymer.

Particularly preferred amphiphilic copolymers are those which comprise
(i) from 95 to 45% by weight of isobutene, diisobutene, styrene or mixtures thereof and
(ii) from 5 to 55% by weight of acrylic acid, methacrylic acid, maleic acid, monoesters of maleic acid or mixtures thereof
incorporated in the form of polymerized units. Copolymers which comprise
(i) from 45 to 80% by weight of styrene,
(ii) from 55 to 20% by weight of acrylic acid and, if appropriate,
(iii) additionally further monomers
incorporated in the form of polymerized units are preferably used as a stabilizer for the miniemulsion. The copolymers can, if appropriate, comprise units of monoesters of maleic acid incorporated in the form of polymerized units as further monomers (iii). Such copolymers are obtainable, for example, by copolymerizing copolymers from styrene, diisobutene or isobutene or mixtures thereof with maleic anhydride in the absence of water and treating the copolymers with alcohols after the polymerization, from 5 to 50 mol % of a monohydric alcohol being used per mole of anhydride groups in the copolymer. Suitable alcohols are, for example, methanol, ethanol, n-propanol, isopropanol, n-butanol, isobutanol and tert-butanol. However, it is also possible to react the anhydride groups of the copolymers with polyhydric alcohols, such as glycol or glycerol. Here, however, the reaction is continued only until only one OH group of polyhydric alcohol reacts with the anhydride group. If the anhydride groups of the copolymers are not completely reacted with alcohols, ring-opening of the anhydride groups not reacted with alcohols takes place as a result of addition of water.

Other compounds suitable as a stabilizer for oil-in-water emulsions are, for example, commercially available polymers of monoethylenically unsaturated acids and graft polymers of N-vinylformamide on polyalkylene glycols, which are described, for example, in WO-A-96/34903. The grafted-on vinylformamide units can, if appropriate, be hydrolyzed, for example up to 10%. The proportion of grafted-on vinylformamide units is preferably from 20 to 40% by weight, based on polyalkylene glycol. Polyethylene glycols having molar masses from 2000 to 10 000 are preferably used.

Zwitterionic polyalkylene polyamines and zwitterionic polyethylenimines are also suitable for stabilizing the oil-in-water emulsions. Such compounds are disclosed, for example, in EP-B-0 112 592. They are obtainable, for example, by first alkoxylating a polyalkylenepolyamine or polyethylenimine, for example with ethylene oxide, propylene oxide and/or butylene oxide and then quaternizing the alkoxylation products, for example with methyl bromide or dimethyl sulfate, and then sulfating the quaternized, alkoxylated products with chlorosulfonic acid or sulfur trioxide. The molar mass of the zwitterionic polyalkylenepolyamine is, for example, from 1000 to 9000, preferably from 1500 to 7500. The zwitterionic polyethylenimines preferably have molar masses in the range of from 1500 to 7500 Dalton. The other, abovementioned stabilizers are used, if appropriate, in combination with a surfactant for stabilizing the emulsions. If they are employed, they are used, for example, in amounts of from 0.05 to 15% by weight, preferably from 0.5 to 5% by weight, based on the monomers.

In order to obtain stable aqueous polymer dispersions, polymerization can, if appropriate, additionally be carried out in the presence of protective colloids. They have as a rule average molar masses $M_w$ above 500, preferably of more than 1000. Examples of protective colloids are polyvinyl alcohols, cellulose derivatives, such as carboxymethylcellulose, polyvinylpyrrolidone, polyethylene glycols, graft polymers of vinyl acetate and/or vinyl propionate on polyethylene glycols, polyethylene glycols endcapped at one or both ends with alkyl, carboxyl or amino groups, polydiallyldimethylammonium chlorides and/or polysaccharides, such as, in particular, water-soluble starches, starch derivatives and proteins. Such products are described, for example, in Römpp, Chemie Lexikon 9th edition, volume 5, page 3569 or in Houben-Weyl, Methoden der organischen Chemie, 4th edition, volume 14/2, section IV, Umwandlung von Cellulose and Stärke by E. Husemann and R. Werner, pages 862-915 and in Ullmanns Encyclopedia for Industrial Chemistry, 6th edition, volume 28, page 533 et seq., under Polysaccharides.

For example, all types of starch are suitable, e.g. both amylose and amylopectin, natural starches, hydrophobically or hydrophilically modified starches, anionic starches, cationically modified starches, degraded starches, it being possible for the starch degradation to be effected, for example, oxidatively, thermally, hydrolytically or enzymatically and for both natural and modified starches to be used for the starch degradation. Further suitable protective colloids are dextrins and crosslinked water-soluble starches, which are water-swellable.

Preferably used as a protective colloid are natural, water-soluble starches which, for example, can be converted into a water-soluble form with the aid of starch digestion and anionically modified starches, such as oxidized potato starch. Particularly preferred are anionically modified starches, the molecular weight of which can be reduced. The molecular weight reduction is preferably carried out enzymatically. The average molar mass $M_w$ of the degraded starches is, for example, from 500 to 100 000, preferably from 1000 to 30 000. The degraded starches have, for example, an intrinsic viscosity [η] of from 0.04 to 0.5 dl/g. Such starches are described, for example, in EP-B-0 257 412 and in EP-B-0 276 770. If protective colloids are used in the polymerization, the amounts used are, for example, from 0.5 to 50, in particular from 5 to 40% by weight, in general from 10 to 30% by weight, based on the monomers used in the polymerization.

In order to modify the properties of the polymers, the polymerization can, if appropriate, be carried out in the presence of at least one polymerization regulator. Examples of polymerization regulators are organic compounds which comprise sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea, aldehydes, such as formaldehyde, acetaldehyde and propionaldehyde, organic acids, such as formic acid, sodium formate or ammonium formate, alcohols such as, in particular, isopropanol, and phosphorus compounds, such as sodium hypophosphite. If a regulator is used in the polymerization the amount used in each case is, for example, from 0.01 to 5, preferably from 0.1 to 1, % by weight, based on the monomers used in the polymerization.

The oil-in-water emulsion is subjected to free radical polymerization. The polymerization is effected in general in the presence of at least one free radical polymerization initiator. All compounds which are capable of initiating a polymerization are suitable as the polymerization initiator. These are substantially peroxides, hydroperoxides, azo compounds and redox catalysts. Examples of initiators are described in WO-A-99/40123, page 32, line 45 to page 34, line 9. The polymerization can also be initiated by the action of high-energy radiation, such as UV or actinic or radioactive radiation, the procedure being effected, if appropriate, in the presence of at least one sensitizer. Those initiators which dissolve in the oil phase are preferably used. The polymerization of the monomers in the miniemulsion can also be effected electrochemically, with the aid of microwave radiation and/or by the action of ultrasound. The polymerization temperature is, for example, from 0 to 120° C.; it is carried out at temperatures above 100° C. and under elevated pressure in pressure-resistant apparatuses. In general, the suspension polymerization of the oil-in-water emulsion is carried out in the temperature range of from 0 to 95° C.

The invention also relates to a process for the preparation of aqueous dispersions of polymers which have an average particle diameter of at least 1 μm and which comprise a fluorescent dye, by free radical suspension polymerization of ethylenically unsaturated monomers in an oil-in-water emulsion whose disperse phase comprises at least one fluorescent dye dissolved in at least one ethylenically unsaturated monomer and has an average particle diameter of at least 1 μm, in the presence of a surface-active compound, the suspension polymerization being carried out in the presence of at least 0.5% by weight, based on the monomers, of at least one hydrophobic, nonpolymerizable, organic compound, of a hydrophobic polymer of at least one $C_2$- to $C_6$-olefin, of a siloxane having a molar mass $M_w$ of up to 5000 and/or polystyrene having a molar mass $M_w$ of up to 10 000.

The suspension polymerization is carried out, for example, in the presence of from 0.5 to 50% by weight, preferably in the presence of from 1 to 20% by weight, based on the monomers, of a hydrophobic, nonpolymerizable, organic compound, of a hydrophobic polymer of at least one $C_2$- to $C_6$-olefin, of a siloxane having a molar mass $M_w$ of up to 5000 and/or of a polystyrene having a molar mass $M_w$ of up to 10 000. The suspension polymerization is preferably carried out in the presence of from 0.5 to 50% by weight of hexadecane and/or white oil, particularly preferably in the presence of from 2 to 20% by weight of hexadecane and/or white oil.

The residual monomer content of the dispersions according to the invention which are thus prepared can be reduced by chemical deodorization as described, for example, by P. H. H. Araújo, C. Sayer, J. G. R. Poco, R. Giudici, in Polymer Engineering and Science, 2002 (42), 1442-1468, or disclosed in EP 1 375 530 B1.

The solids content of the aqueous dispersions is, for example, from 10 to 60% by weight, preferably from 20 to 45% by weight and in general in the range of from 30 to 45% by weight.

The dispersed polymer particles comprise the hydrophobic substance and at least one fluorescent dye. They have an average particle size of, for example, from 1 to 100 μm, preferably from 1.1 to 25 μm and in general from 1.1 to 4 μm and comprise at least one fluorescent dye in an amount of, for example, from 0.001 to 10% by weight, in general from 0.01 to 1.0% by weight. The particle sizes of the finely divided polymer which are stated here are weight average particle sizes, as can be determined by light scattering. Methods for this purpose are familiar to the person skilled in the art, for example from H. Wiese in D. Distler, Wässrige Polymerdispersionen, Wiley-VCH 1999, section 4.2.1, page 40 et seq., and literature cited there, and H. Auweter, D. Horn, J. Colloid Interf. Sci. 105 (1985) 399, D. Lilge, D. Horn, Colloid Polym. Sci. 269 (1991) 704 or H. Wiese, D. Horn, J. Chem. Phys. 94 (1991) 6429.

The dispersed particles have a uniform particle size distribution. The uniformity can be characterized, for example, by the so-called uniformity $$\frac{\sum X_i |d(v, 0.5) - d_i|}{d(v, 0.5) \sum X_i},$$

where $d_i$ is the average diameter of the size class i, $X_i$ is the measured contribution of this size class to the size distribution, $d(v,0.5)$ is the volume-averaged median, and the sum is calculated in each case over all size classes i (Mastersizer Reference Manual, Malvern Instruments Ltd., Spring Lane South, Malvern, Worcs. WR14 1AT, U.K.). Since the uniformity thus defined sums deviations from the volume average, low values mean a greater uniformity. The particles produced according to the invention have a uniformity below 1.0 in scattered light measurements with evaluation according to the Mie theory.

Drying of the aqueous dispersions gives polymer particles which have an average particle size diameter of at least 1 μm and which comprise at least one fluorescent dye, in the form of a powder. Examples of drying methods are spray drying and freeze drying. The individual particles are present in the powders in general as aggregates of a plurality of individual particles. They can be subjected, for example, to dry or wet milling. For example, the aggregates of individual particles can be milled to give particles having an average particle size of from 1 to 100 μm. However, individual particles having an individual particle diameter of from 10 to 1000 nm, in general from 200 to 1000 nm may also form during the milling process. These particle sizes are then in the range which is characteristic for polymer particles which are produced by miniemulsion polymerization, for example according to the process disclosed in WO-A-99/40123.

The invention also relates to the use of aqueous dispersions of polymers, which are obtainable by free radical suspension polymerization or by free radical miniemulsion polymerization of ethylenically unsaturated monomers in an oil-in-water emulsion whose disperse phase comprises at least one fluorescent dye dissolved in at least one ethylenically unsaturated monomer and has an average particle diameter of at least 10 nm, in the presence of at least one surface-active compound and at least 0.5% by weight, based on the monomers, of at least one hydrophobic, nonpolymerizable, organic compound, of a hydrophobic polymer of at least one $C_2$- to $C_6$-olefin having a molar mass $M_w$ of up to 10 000, of a siloxane having a molar mass $M_w$ of up to 5000 and/or polystyrene having a molar mass $M_w$ of up to 10 000, and of the powders obtainable from these polymer dispersions in each case by drying and comprising at least one fluorescent dye for the marking of materials.

Preferably, the aqueous dispersions of polymers which comprise at least one fluorescent dye and a hydrophobic substance and have an average particle size of the dispersed particles of from 1 μm to 100 μm, in particular from 1.1 to 25 μm, which dispersions can be prepared by suspension polymerization, are used for the marking of materials. However, the aqueous dispersions obtainable by miniemulsion polymerization by the process disclosed in WO-A-99/40123 and having an average particle diameter of <500 nm, the suitable dispersions comprising at least one fluorescent dye, and dispersions whose polymer particles have an average particle diameter of from >500 nm to 1000 nm and comprise at least one fluorescent dye can also be used. Such dispersions can be prepared, for example, by bringing the average particle size of the droplets emulsified in water and comprising a solution of at least one hydrophobic, ethylenically unsaturated monomer, at least one hydrophobic substance and at least one fluorescent dye to a value in the range of from >500 nm to 1000 nm by emulsification, and subjecting the oil-in-water emulsion thus obtainable to free radical polymerization in a known manner by the suspension polymerization method.

The aqueous dispersions according to the invention and the aqueous dispersions of polymers which comprise in each case at least one fluorescent dye and one hydrophobic substance, which dispersions are obtainable by miniemulsion polymerization, and the polymer powders which can be prepared from the dispersions by, for example, spray drying are used, for example, for the marking of textiles, paper, paper productions, finishes, starting materials for the building industry, adhesives, fuels, plastics films, paper coating slips, paper sizes, liquid formulations for crop protection, pharmaceutical and cosmetic formulations, printing inks for the printing of packagings, paper and data media. Of particular practical importance is the use of the aqueous dispersions according to the invention and of the aqueous dispersions of polymers which comprise in each case at least one fluorescent dye and a hydrophobic substance, which dispersions are obtainable by miniemulsion polymerization, and the polymer powders which can be prepared from the dispersions by, for example, spray drying for the marking of packagings of all types. The application can be effected, for example, directly, e.g. by spraying a polymer dispersion or together with a printing ink. The packagings may be, for example, paper, board, cardboard, plastics films, such as films of polyethylene, polypropylene, polyester or polyamide, or composite materials, e.g. composites comprising paper and at least one plastics film, composites comprising a metal foil and at least one plastics film, such as blister films for the packaging of tablets, or composites comprising at least two different plastics films. The plastics films can, if appropriate, be coated on one or both sides with a dispersion, e.g. a polyvinylidene chloride dispersion. In the case of these composites—as already mentioned above—either paper or a paper product or a plastics film is marked with a dispersion to be used according to the invention or with the aqueous dispersions of polymers which comprise in each case at least one fluorescent dye and a hydrophobic substance, which dispersions are obtainable by miniemulsion polymerization, or with the polymer powders obtainable in each case from the dispersions.

The aqueous dispersions comprising at least one fluorescent dye are preferably used for the marking of paper, paper products, finishes, adhesives, paper coating slips, paper sizes and liquid formulations for crop protection. They are added, for example, to the substances to be marked, in an amount which in most cases is such that the marking is undetectable or virtually undetectable in or on the materials with the naked eye. The marking is detected, for example, with the aid of laser scanning microscopy, with the aid of a fluorescence microscope or with the aid of a fluorescence spectrometer. The solids content of the aqueous dispersions is usually from 1 to 70% by weight, preferably from 10 to 50% by weight. These dispersions can be used directly or after dilution with a dispersing medium, preferably water, for the marking of materials.

In order to mark materials, the aqueous polymer dispersions comprising at least one fluorescent dye or the powders obtained therefrom are used in amounts such that the fluorescent dyes are detectable in the marked materials. For example, from 0.01 to 25% by weight, preferably from 0.1 to 5% by weight, of at least one type of polymeric dispersion particles which comprise at least one fluorescent dye are used for the marking of paper, paper coating slips, sizes, adhesives, cement plasticizers, primers in the building sector and finishes. For example, the paper coating slips marked according to the invention are applied with the aid of a coating unit to base paper in an amount of, for example, 11 g/m² and the coated paper is dried.

In addition to the aqueous dispersions according to the invention, which comprise at least one fluorescent dye, the paper coating slips comprise the constituents customary for paper coating slips, such as pigments, dispersants, thickeners and binders. The binders are usually emulsion polymers which preferably comprise at least 40% by weight, preferably at least 60% by weight, particularly preferably at least 80% by weight, of so-called main monomers.

Preferred main monomers are $C_1$-$C_{10}$-alkyl(meth)acrylates and mixtures of alkyl(meth)acrylates with vinylaromatics, in particular styrene (also summarized as polyacrylate binder compositions), or hydrocarbons having 2 double bonds, in particular butadiene, or mixtures of such hydrocarbons with vinylaromatics, in particular styrene (also summarized as polybutadiene binder compositions).

In the case of polybutadiene binder compositions, the weight ratio of butadiene to vinylaromatics (in particular styrene) may be, for example, from 10:90 to 90:10, preferably from 20:80 to 80:20.

In addition to the main monomers, the polymer may comprise further monomers, e.g. monomers having carboxyl, sulfo or phosphonic acid groups. Carboxyl groups are preferred. For example, acrylic acid, methacrylic acid, itaconic acid, maleic acid or fumaric acid and aconitic acid may be mentioned. The content of ethylenically unsaturated acids in the emulsion polymer is in general less than 5% by weight.

Further monomers are, for example, also monomers comprising hydroxyl groups, in particular $C_1$-$C_{10}$-hydroxyalkyl (meth)acrylates, or amides such as (meth)acrylamide.

Such binders are available, for example, under the trade names Styronal® and Acronal® (both from BASF Aktiengesellschaft).

According to the invention, these binders are first mixed with the aqueous dispersions according to the invention which comprise at least one fluorescent dye. The binder compositions thus obtained are then used for the preparation of a paper coating slip.

The present invention therefore also relates to binder compositions which comprise a binder and dispersions according to the invention comprising at least one fluorescent dye.

The present invention furthermore also relates to a paper coating slip which comprises such a binder composition.

Paper can also be marked by using, in papermaking, a paper size which comprises an aqueous polymer dispersion comprising at least one fluorescent dye. Suitable engine sizes for paper are, for example, aqueous polymer dispersions, aqueous emulsions of alkyldiketenes or alkenylsuccinic anhydrides or rosin size. Surface sizes for paper may also comprise an aqueous polymer dispersion comprising at least one fluorescent dye and can themselves be marked therewith and can also be used for the marking of paper and paper products.

The present invention therefore also relates to paper sizes which comprise aqueous dispersions according to the invention comprising at least one fluorescent dye.

For marking of paper and paper products, it is of course also possible to apply an aqueous polymer dispersion comprising at least one fluorescent dye or powders obtained therefrom directly to the surface of paper or paper products, such as board or cardboard. The application of the aqueous polymer dispersion comprising at least one fluorescent dye to a paper product can be effected, for example, with the aid of a size press or with the aid of a spray apparatus. It is also possible to spray or to print the aqueous dispersion required for the marking only on parts of a paper product in order to mark the product partially, for example as a barcode. Such markings are of interest, in particular for packaging materials. The polymer particles which comprise a fluorescent dye can be localized, for example, by means of confocal laser scanning microscopy and can be uniquely identified on the marked materials by fluorescence spectroscopy.

For the marking of fuels, in particular of heating oil, the aqueous dispersions of polymers which comprise at least one fluorescent dye, or the powders obtainable therefrom by spray drying, are used, for example, in an amount of, for example, from 0.00001 to 1% by weight, preferably from 0.0001 to 0.1% by weight, based on fuel, the data for the dispersions being based on the solids content of the dispersion. For the marking of liquid formulations for crop protection, pharmaceutical and cosmetic formulations, the polymer particles of the aqueous polymer dispersions comprising at least one fluorescent dye or the powders obtainable therefrom by spray drying are used, for example, in amounts of from 0.00001 to 1% by weight, preferably from 0.0001 to 0.2% by weight, in general from 0.0001 to 0.1% by weight. The liquid formulations for crop protection are usually aqueous formulations, such as emulsions or dispersions of, for example, pesticides, herbicides or fungicides.

The polymer particles which comprise at least one fluorescent dye and are used according to the invention for the marking of materials are lightfast. They are moreover stable to migration, i.e. they do not bleed.

EXAMPLES

Example 1

The following mixture was initially taken in a 2 l kettle which was equipped with a dispenser stirrer (diameter 5 cm):

| | |
|---|---|
| 450 g | of water |
| 250 g | of polyvinyl alcohol (Mowiol ® 40/88 (10% in water) |
| 52.5 mg of NaNO$_2$ | |
| 30 g | of allyl methacrylate |
| 270 g | of methyl methacrylate |
| 0.06 g | of yellow fluorescent dye - Yellow 083 (Lumogen ® F) |
| 15 g | of hexadecane |

The mixture was dispersed for 30 min at room temperature at a speed of 5000 rpm and then transferred to a 2 l kettle equipped with an anchor stirrer. 1.575 g of tert-butyl perpivalate were added and the kettle was heated to 60° C. in the course of 1 hour. The kettle content was then heated to 70° C. over 2 hours, then to 85° C. in 30 min and kept at this temperature for 1 hour. 7 g of a 10% strength aqueous solution of tert-butyl hydroperoxide were added and a solution of 0.4 g of ascorbic acid and 20 g of water was metered in over one hour. The kettle was then cooled to room temperature.

A dispersion of crosslinked particles colored with a fluorescent dye and having a volume-averaged particle diameter of 2.0 µm and a narrow particle size distribution with a uniformity of 0.5, determined by means of light scattering analysis according to the Mie theory (Malvern Mastersizer) was obtained, a refractive index of 1.49 and an absorption index of 0 being taken as the basis for the particles. The solids content was 30.85% by weight.

Example 2

The following mixture was initially taken in a 2 l kettle which was equipped with a dispenser stirrer (diameter 5 cm):

| | |
|---|---|
| 441.45 g | of water |
| 45 g | of polyvinyl alcohol (Mowiol ® 15/79 (10% in water) |
| 180 g | of Culminal ® MHPC 100 (5% in water), methylhydroxypropylcellulose |
| 52.5 mg of NaNO$_2$ | |
| 30 g | of butanediol diacrylate |
| 270 g | of methyl methacrylate |
| 0.06 g | of yellow fluorescent dye - Yellow 083 (Lumogen ® F) |
| 15 g | of hexadecane |

The emulsification of the mixture and the polymerization of the monomers were effected as described in example 1. A dispersion of crosslinked particles colored with fluorescent dye and having an average particle diameter of 2.6 µm and a narrow particle size distribution with a uniformity of 0.5 was obtained. The solids content of the dispersion was 29.6% by weight.

Example 3

The following mixture was initially taken in a 2 l kettle which was equipped with a dispenser stirrer (diameter 5 cm):

| | |
|---|---|
| 450 g | of water |
| 250 g | of Mowiol ® 40/88 (10% in water), partly hydrolyzed polyvinyl alcohol |
| 52.5 mg of NaNO$_2$ | |
| 15 g | of allyl methacrylate |
| 285 g | of methyl methacrylate |
| 0.1 g | of yellow fluorescent dye - (Lumogen ® F Yellow 083) |
| 0.1 g | of orange fluorescent dye (Lumogen ® F - Orange 240) |
| 0.1 g | of red fluorescent dye (Lumogen ® F - Red 300) |
| 15 g | of hexadecane |

The emulsification of the mixture and the polymerization of the monomers were effected as described in example 1. A dispersion of crosslinked particles colored with 3 fluorescent dyes and having an average particle diameter of 1.8 µm and a narrow particle size distribution with a uniformity of 0.4 was obtained. The solids content of the dispersion was 31.5% by weight.

Example 4

The following mixture was initially taken in a 2 l kettle which was equipped with a dispenser stirrer (diameter 5 cm):

| | |
|---|---|
| 450 g | of water |
| 250 g | of polyvinyl alcohol [Mowiol ® 40/88 (10% in water)] |
| 52.5 mg | of NaNO$_2$ |
| 30 g | of allyl methacrylate |
| 270 g | of methyl methacrylate |
| 0.06 g | of yellow fluorescent dye (Lumogen ® F - Yellow 083) |
| 0.3 g | of red fluorescent dye (Lumogen ® F - Red 300) |
| 15 g | of hexadecane |

The emulsification of the mixture and the polymerization of the monomers were effected as described in example 1. A dispersion of crosslinked particles colored with 2 fluorescent dyes and having a volume-average particle diameter of 1.8 µm and a narrow particle size distribution with a uniformity of 0.5 was obtained. The solids content of the dispersion was 31% by weight.

Example 5

The following mixture was added to a 2 l kettle having a dispenser stirrer (diameter 5 cm):

| | |
|---|---|
| 450 g | of water |
| 250 g | of polyvinyl alcohol [Mowiol ® 40/88 (10% in water)] |
| 2.1 g | of NaNO$_2$ (2.5% in water) |
| 30 g | of butanediol diacrylate |
| 270 g | of methyl methacrylate |
| 0.09 g | of red fluorescent dye (Lumogen ® F - Red 305) |
| 15 g | of hexadecane |

The emulsification of the mixture and the polymerization of the monomers were effected as described in example 1.

A dispersion of crosslinked particles colored with a fluorescent dye and having a mean particle diameter of 2.4 µm and a uniformity of 0.5 was obtained. 10 g of coagulum were found. After physical deodorization, the solids content of the dispersion was 33.4% by weight.

Example 6

The following mixture was added to a 2 l kettle having a dispenser stirrer (diameter 5 cm):

| | |
|---|---|
| 450 g | of water |
| 250 g | of polyvinyl alcohol [Mowiol ® 40/88 (10% in water)] |
| 52.5 g | of NaNO$_2$ (2.5% in water) |
| 30 g | of allyl methacrylate |
| 270 g | of methyl methacrylate |
| 0.03 g | of yellow fluorescent dye (Lumogen ® F - Yellow 083) |
| 0.06 g | of orange fluorescent dye (Lumogen ® F - Orange 240) |
| 0.09 g | of red fluorescent dye (Lumogen ® F - Red) |
| 15 g | of hexadecane |

The mixture was dispersed for 60 min at room temperature at a speed of 6500 rpm and then transferred to a 2 l kettle equipped with an anchor stirrer. 1.575 g of tert-butyl perpivalate were added and the kettle was heated to 65° C. in the course of 1 hour. Thereafter, heating to 70° C. over 2 hours and then to 85° C. in 30 min was effected and this temperature was maintained for 1 hour. 7 g of a 10% aqueous solution of tert-butyl hydroperoxide were added and a solution of 0.4 g of ascorbic acid in 20 g of water was metered in over one hour. The kettle was then cooled to room temperature.

A dispersion of crosslinked particles colored with a fluorescent dye and having a mean particle diameter of 1.91 µm and a uniformity of 0.5 was obtained. The solids content of the dispersion was 31.7% by weight.

Example 7

The following mixture was added to a 2 l kettle having a dispenser stirrer (diameter 5 cm):

| | |
|---|---|
| 502.7 g | of water |
| 30 g | of polyvinyl alcohol [Mowiol ® 15/79 (10% in water)] |
| 120 g | of Culminal ® MHPC 100 (5% in water), methylhydroxypropylcellulose |
| 52.5 mg | of NaNO$_2$ |
| 120 g | of butanediol diacrylate |
| 150 g | of methyl methacrylate |
| 30 g | of methacrylic acid |
| 0.06 g | of yellow fluorescent dye (Lumogen ® F - Yellow 083) |
| 0.015 g | of hydroquinone monomethyl ether |
| 15 g | of hexadecane |

The emulsification of the mixture and the polymerization of the monomers were effected as described in example 1.

A dispersion of crosslinked particles colored with a fluorescent dye and having a mean particle diameter of 4.9 µm was obtained. The solids content of the dispersion was 30.3% by weight.

Example 8

The following mixture was added to a 2 l kettle having a dispenser stirrer (diameter 5 cm):

| | |
|---|---|
| 450 g | of water |
| 250 g | of polyvinyl alcohol [Mowiol ® 40/88 (10% in water)] |
| 2.1 g | of NaNO$_2$ (2.5% in water) |
| 30 g | of allyl methacrylate |
| 240 g | of methyl methacrylate |
| 30 g | of n-butyl acrylate |
| 0.09 g | of red fluorescent dye (Lumogen ® F - Red 305) |
| 15 g | of hexadecane |

The emulsification of the mixture and the polymerization of the monomers were effected as described in example 1.

A dispersion of crosslinked particles colored with a fluorescent dye and having a mean particle diameter of 2.1 µm and a uniformity of 0.4 was obtained. 6 g of coagulum were found and the solids content of the dispersion was 29.9% by weight.

Example 9

The following mixture was added to a 2 l kettle having a dispenser stirrer (diameter 5 cm):

| | |
|---|---|
| 370.1 g | of water |
| 208.3 g | of polyvinyl alcohol [Mowiol ® 40/88 (10% in water)] |
| 1.75 g | of NaNO$_2$ (2.5% in water) |
| 25 g | of butanediol diacrylate |
| 225 g | of methyl methacrylate |

| 0.75 g | of ethylhexyl thioglycolate |
| 0.08 g | of red fluorescent dye (Lumogen ® F - Red 305) |
| 12.5 g | of hexadecane |

The emulsification of the mixture and the polymerization of the monomers were effected as described in example 1.

A dispersion of crosslinked particles colored with a fluorescent dye and having a mean particle diameter of 1.6 μm and a uniformity of 0.4 was obtained, and the solids content of the dispersion was 28.3% by weight.

Example 10

The following mixture was added to a 2 l kettle having a dispenser stirrer (diameter 5 cm):

| 450 g | of water |
| 250 g | of polyvinyl alcohol [Mowiol ® 40/88 (10% in water)] |
| 2.1 g | of $NaNO_2$ (2.5% in water) |
| 1.35 g | of butanediol diacrylate |
| 298.65 g | of methyl methacrylate |
| 0.09 g | of red fluorescent dye (Lumogen ® F - Red 305) |
| 15 g | of hexadecane |

The emulsification of the mixture and the polymerization of the monomers were effected as described in example 1.

A dispersion of crosslinked particles colored with a fluorescent dye and having a mean particle diameter of 1.9 μm and a uniformity of 0.5 was obtained, and the solids content of the dispersion was 31.4% by weight.

Example 11

The following mixture was added to a 2 l kettle having a dispenser stirrer (diameter 5 cm):

| 450 g | of water |
| 250 g | of polyvinyl alcohol [Mowiol ® 40/88 (10% in water)] |
| 2.1 g | of $NaNO_2$ (2.5% in water) |
| 300 g | of methyl methacrylate |
| 0.09 g | of red fluorescent dye (Lumogen ® F - Red 305) |
| 15 g | of hexadecane |

The emulsification of the mixture and the polymerization of the monomers were effected as described in example 1, the total amount of tert-butyl perpivalate being divided into three equal parts. The first part was added at 60° C., the second part at 65° C. and the third part at 70° C.

A dispersion of uncrosslinked particles colored with a fluorescent dye and having a mean particle diameter of 1.5 μm and a uniformity of 0.4 was obtained, and the solids content of the dispersion was 31.3% by weight.

Example 12

The following mixture was added to a 2 l kettle having a dispenser stirrer (diameter 5 cm):

| 450 g | of water |
| 250 g | of polyvinyl alcohol [Mowiol ® 40/88 (10% in water)] |
| 2.1 mg | of $NaNO_2$ |
| 30 g | of 1,4-butanediol diacrylate |
| 270 g | of methyl methacrylate |
| 0.09 g | of red fluorescent dye (Lumogen ® F - Red) |
| 15 g | of white oil (CAS No. 8042-47-5) |

The mixture was dispersed for 30 min at room temperature at a speed of 5000 rpm and then transferred to a 2 l kettle equipped with an anchor stirrer. 2.1 g of tert-butyl perpivalate were added and the kettle was heated to 60° C. in the course of 1 hour. The kettle content was then heated to 70° C. over 2 hours, then increased to 85° C. in 30 minutes and kept at this temperature for 1 hour. 7 g of a 10% strength aqueous solution of tert-butyl hydroperoxide were added and a solution of 0.4 g of ascorbic acid in 20 g of water was metered in over one hour. The kettle was then cooled to room temperature.

A dispersion of crosslinked particles colored with a fluorescent dye and having a mean particle diameter of 1.2 μm and a broad particle size distribution was obtained. The solids content of the dispersion was 27.6% by weight.

Example 13

The following mixture was added to a 2 l kettle having a dispenser stirrer (diameter 5 cm):

| 450 g | of water |
| 250 g | of polyvinyl alcohol [Mowiol ® 40/88 (10% in water)] |
| 2.1 mg | of $NaNO_2$ |
| 24 g | of 1,4-butanediol diacrylate |
| 216 g | of methyl methacrylate |
| 0.09 g | of red fluorescent dye (Lumogen ® F - Red) |
| 60 g | of hexadecane |

The emulsification of the mixture and the polymerization of the monomers were effected as described in example 12.

A dispersion of crosslinked particles colored with a fluorescent dye and having a mean particle diameter of 1.2 μm and a broad particle size distribution was obtained. The solids content of the dispersion was 29.0% by weight.

Example 14

The following mixture was added to a 2 l kettle having a dispenser stirrer (diameter 5 cm):

| 450 g | of water |
| 250 g | of polyvinyl alcohol [Mowiol ® 26/88 (10% in water)] |
| 2.1 mg | of $NaNO_2$ |
| 30 g | of 1,4-butanediol diacrylate |
| 270 g | of methyl methacrylate |
| 0.09 g | of red fluorescent dye (Lumogen ® F - Red) |
| 15 g | of hexadecane |

The emulsification of the mixture and the polymerization of the monomers were effected as described in example 12.

A dispersion of crosslinked particles colored with a fluorescent dye and having a mean particle diameter of 1.2 μm and a narrow particle size distribution was obtained. The solids content of the dispersion was 29.0% by weight.

USE EXAMPLES

Formulation of Paper Coating Slips

The coating slips stated in the table below were prepared in a 1 l container. pH was about 9 and the viscosity was adjusted to 1000 mPa·s.

TABLE

| Composition | (1) | (2) | (3) | (4) | (5) | (6) | (7) |
|---|---|---|---|---|---|---|---|
| CaCO$_3$ pigment (Hydrocarb 90) | 100.0 | 70.0 | 70.0 | 70.0 | 70.0 | 70.0 | 70.0 |
| Clay pigment (Amazon 88) | 97.0 | 30.0 | 30.0 | 30.0 | 30.0 | 30.0 | 30.0 |
| Dispersant (Polysalz S) | 45.3 | 0.30 | 0.30 | 0.30 | 0.30 | 0.30 | 0.30 |
| NaOH | 25.0 | 0.05 | 0.05 | 0.05 | 0.05 | 0.05 | 0.05 |
| Styrene butadiene binder Styronal ® D 808 | 49.7 | 10.0 | 10.0 | 10.0 | 10.0 | 10.0 | 10.0 |
| Thickener (Sterocoll ®) | 40.5 | 0.30 | 0.30 | 0.30 | 0.30 | 0.30 | 0.30 |
| Marker dispersion 1 | 30.9 | 1.0 | 0.5 | 0.2 | 0.1 | 0.010 | 0.200 |
| Marker dispersion 2 | 32.5 | 1.0 | 0.5 | 0.2 | 0.1 | 0.010 | 0.400 |
| Marker dispersion 3 | 31.1 | 1.0 | 0.5 | 0.2 | 0.1 | 0.010 | 0.800 |

In the notation customary in the field, the first data column of the table, under (1) indicates the solids content of the starting materials used, and each of the following 6 columns (2) to (7) indicate the relative concentrations, based on 100 parts of pigment (in this case Hydrocarb 90+Amazon 88), for one use example in each case.

The dispersion prepared according to example 3 was used as marker dispersion 1.

Marker dispersion 2 was prepared analogously to the dispersion according to example 3 but comprised only the red fluorescent dye (Lumogen® F—Red 300) with the same total dye concentration.

Marker dispersion 3 was likewise prepared analogously to example 3, but with the dyes Lumogen® F—Red 300 and Lumogen® F—Yellow 083 in the same proportions. The dispersion consisted of two-color particles.

The coating slip was then applied to a base paper from Scheufelen by means of a doctor blade so that a coat weight of 15 g/m$^2$ was obtained. The papers coated in this manner were then dried using a suitable drying unit. The marking of the paper by the fluorescent marker particles is undetectable with the naked eye, but a spectroscopic examination by means of laser scanning microscopy permitted unambiguous identification of all particle types used for the marking.

Marking of Paper Sizes

Marker particles produced according to the invention were used in the surface finishing of paper. For this purpose, the marker dispersions 1, 2 and 3 were mixed with Basoplast® 400DS, a standard dispersion of acrylate copolymers, and this mixture was then stirred into an aqueous starch solution (ratio of synthetic product to starch about 1:100). The prepared mixture had a solids content of from 8 to 15% and was applied in this form as a film to paper by means of a doctor blade. The coat weight was about 2 g/m$^2$ of starch, corresponding to 0.02 g/m$^2$ of polymer. In spectroscopic examinations by means of laser scanning microscopy, the marker particles used could be unambiguously identified.

Marking of Film Coatings 0.75 ml or 1.5 ml and 15 ml of a marker dispersion according to example 3 or analogously prepared dispersions of one- and two-colored particles having the same total concentration of dye of the types Lumogen® F—Red 300 or Lumogen® F—Red 300 and Lumogen® F—Orange 240 were mixed into 1 kg of a 45% strength dispersion of the sealable acrylate Epotal® A 816 and the mixture was applied by means of an airbrush to a BOPP film (MB 200 from ExxonMobil) which was electrically pretreated and primed with a PU dispersion (Epotal® P 350) beforehand. In spectroscopic examinations by means of laser scanning microscopy, the marker particles used could be unambiguously identified.

We claim:

1. An aqueous dispersion of polymers which have a particle diameter of at least 1 µm and comprise a fluorescent dye, wherein said dispersion is obtainable by free radical suspension polymerization of ethylenically unsaturated monomers in an oil-in-water emulsion whose disperse phase comprises at least one fluorescent dye dissolved in at least one ethylenically unsaturated monomer and has an average particle diameter of at least 1 µm, in the presence of at least one surface-active compound and at least 0.5% by weight, based on the monomers, of at least one hydrophobic, nonpolymerizable, organic compound, of a hydrophobic polymer of at least one C$_2$ to C$_6$-olefin having a molar mass M$_w$ of up to 10 000, of a siloxane having a molar mass M$_w$ of up to 5000 and/or polystyrene having a molar mass M$_w$ of up to 10 000.

2. The aqueous dispersion according to claim 1, wherein
    (a) hydrophobic monomers from the group consisting of C$_1$- to C$_8$-alkyl esters of acrylic acid, C$_1$- to C$_8$-alkyl esters of methacrylic acid, vinyl acetate, vinyl propionate, vinyl butyrate, styrene, chlorostyrene and/or a-methylstyrene,
    (b) if appropriate, hydrophilic monomers from the group consisting of ethylenically unsaturated C$_3$- to C$_6$-carboxylic acids, vinylsulfonic acid, 2-acrylamido-2-methylpropanesulfonic acid, sulfopropyl acrylate, sulfopropyl methacrylate, styrenesulfonic acid, salts of said acids, acrylonitrile, methacrylonitrile, C$_1$- to C$_8$-hydroxyalkyl esters of C$_1$- to C$_6$-carboxylic acids, di-C$_1$- to C$_3$-alkylamino-C$_2$- to C$_4$-alkyl acrylates, di-C$_1$- to C$_3$-alkylamino-C$_2$- to C$_4$-alkyl methacrylates, acrylamide, methacrylamide, N-vinylformamide and/or N-vinylpyrrolidone and
    (c) if appropriate, at least one crosslinking monomer having at least two double bonds in the molecule
    are used as ethylenically unsaturated monomers.

3. The aqueous dispersion according to claim 1, wherein the monomer mixtures used in the polymerization comprise
    (a) from 60 to 100% by weight of at least one hydrophobic monomer,
    (b) from 0 to 30% by weight of at least one hydrophilic monomer and
    (c) from 0 to 40% by weight of at least one crosslinking monomer having at least two double bonds.

4. The aqueous dispersion according to claim 1, wherein the monomer mixtures used in the polymerization comprise
    (a) from 60 to 99.9% by weight of at least one hydrophobic monomer,
    (b) from 0 to 30% by weight of at least one hydrophilic monomer and
    (c) from 0.1 to 25% by weight of at least one crosslinking monomer.

5. The aqueous dispersion according to claim 1, wherein aliphatic or aromatic hydrocarbons having 10 to 50 carbon atoms, alcohols having 10 to 24 carbon atoms, tetraalkylsilanes, olive oil, perfluoromethyldecalin and/or di-n-butyl esters of C$_4$- to C$_6$-dicarboxylic acids are used as the hydrophobic, nonpolymerizable, organic compound.

6. The aqueous dispersion according to claim 1, wherein homopolymers of at least one C$_2$- to C$_6$-olefin or copolymers of C$_2$- to C$_6$-olefins having a molar mass M$_w$ of up to 10 000, siloxanes having a molar mass M$_w$ of up to 5000 and/or polystyrene having a molar mass M$_w$ of up to 10 000 are used as hydrophobic polymers.

7. The aqueous dispersion according to claim 1, wherein the dispersed polymer particles have an average particle size of from 1.1 to 25 μm and comprise at least one fluorescent dye in an amount of from 0.001 to 10% by weight.

8. A process for the preparation of aqueous dispersions of polymers which have an average particle diameter of at least 1 μm and comprise a fluorescent dye by free radical suspension polymerization of ethylenically unsaturated monomers in an oil-in-water emulsion whose disperse phase comprises at least one fluorescent dye dissolved in at least one ethylenically unsaturated monomer and has an average particle diameter of at least 1 Jim, in the presence of at least one surface-active compound, wherein the suspension polymerization is carried out in the presence of at least 0.5% by weight, based on the monomers, of at least one hydrophobic, nonpolymerizable organic compound, of a hydrophobic polymer of at least one $C_2$- to $C_6$-olefin, of a siloxane having a molar mass $M_w$ of up to 5000 and/or polystyrene having a molar mass $M_w$ of up to 10 000.

9. The process according to claim 8, wherein the suspension polymerization is carried out in the presence of from 0.5 to 50% by weight, based on the monomers, of a hydrophobic, nonpolymerizable, organic compound, of a hydrophobic polymer of at least one $C_2$- to $C_6$-olefin, siloxanes having a molar mass $M_w$ of up to 5000 and/or polystyrene having a molar mass $M_w$ of up to 10 000.

10. The process according to claim 8, wherein the suspension polymerization is carried out in the presence of from 1 to 20% by weight, based on the monomers, of a hydrophobic, nonpolymerizable, organic compound, of a hydrophobic polymer of at least one $C_2$- to $C_6$-olefin, of a siloxane having a molar mass $M_w$ of up to 5000 and/or a polystyrene having a molar mass $M_w$ of up to 10 000.

11. A polymer particle which has an average particle diameter of at least 1 μm and comprises at least one fluorescent dye, wherein said polymer particle is obtainable by drying the aqueous dispersions according to claim 1.

12. The method of obtaining an aqueous dispersions of polymers by free radical suspension polymerization or by free radical miniemulsion polymerization of ethylenically unsaturated monomers in an oil-in-water emulsion whose disperse phase comprises at least one fluorescent dye dissolved in at least one ethylenically unsaturated monomer and has an average particle diameter of at least 100 nm, in the presence of at least one surface-active compound and at least 0.5% by weight, based on the monomers, of at least one hydrophobic, nonpolymerizable, organic compound, of a hydrophobic polymer of at least one $C_2$- to $C_6$-olefin having a molar mass $M_w$ of up to 10 000, of a siloxane having a molar mass $M_w$ of up to 5000 and/or polystyrene having a molar mass $M_w$ of up to 10 000, and of the powder obtainable from these polymer dispersions in each case by drying and comprising at least one fluorescent dye for the marking of materials.

13. The method according to claim 12, wherein the aqueous dispersions of polymers which comprise at least one fluorescent dye and a hydrophobic substance and have an average particle diameter of the dispersed particles of from 1 μm to 100 μm, in particular from 1.1 to 25 μm, which dispersions can be prepared by suspension polymerization, are used for the marking of materials.

14. The method according to claim 12, wherein the aqueous dispersions or the polymer particles comprising at least one fluorescent dye are used for the marking of textiles, paper, paper products, finishes, starting materials for the building industry, adhesives, fuels, plastics films, paper coating slips, paper sizes, liquid formulations for crop protection, pharmaceutical and cosmetic formulations, printing inks for the printing of packagings, paper and data media.

15. A binder composition comprising a binder and an aqueous dispersion according to claim 1.

16. A paper coating slip comprising a binder composition according to claim 15.

17. A paper size comprising an aqueous dispersion according to claim 1.

* * * * *